(12) United States Patent
Nolan et al.

(10) Patent No.: US 8,810,407 B1
(45) Date of Patent: Aug. 19, 2014

(54) WALKER WITH ILLUMINATION, LOCATION, POSITIONING, TACTILE AND/OR SENSOR CAPABILITIES

(75) Inventors: Mark Nolan, El Reno, OK (US); Marcia Nolan, El Reno, OK (US)

(73) Assignee: Guardian Angel Navigational Concepts IP LLC, El Reno, OK (US)

( * ) Notice: Subject to any disclaimer, the term of this patent is extended or adjusted under 35 U.S.C. 154(b) by 254 days.

(21) Appl. No.: 13/118,205

(22) Filed: May 27, 2011

Related U.S. Application Data (60) Provisional application No. 61/349,107, filed on May 27, 2010.

(51) Int. Cl.
*G08B 23/00* (2006.01)

(52) U.S. Cl.
USPC .................. 340/573.1; 340/407.1; 340/815.4; 362/102; 362/276; 367/116

(58) Field of Classification Search
USPC .......... 340/573.1, 539.32, 571, 815.4, 407.1, 340/321, 686.6; 362/102, 253, 276, 802; 367/116
See application file for complete search history.

(56) References Cited

U.S. PATENT DOCUMENTS

| | | | |
|---|---|---|---|
| 3,336,469 A | 8/1967 | Barnes, Sr. et al. | |
| 3,718,896 A * | 2/1973 | Mowat | 367/116 |
| 4,062,371 A | 12/1977 | Bolen | |
| 4,280,578 A | 7/1981 | Perkins | |
| 4,507,653 A * | 3/1985 | Bayer | 340/539.32 |
| 4,583,080 A | 4/1986 | DiVito et al. | |
| 4,768,536 A | 9/1988 | Hawkins | |
| 4,802,542 A | 2/1989 | Houston et al. | |
| 4,809,804 A | 3/1989 | Houston et al. | |
| 4,837,666 A | 6/1989 | Conkle | |
| 5,137,102 A | 8/1992 | Houston, Sr. et al. | |
| 5,168,947 A | 12/1992 | Rodenborn | |
| 5,197,501 A | 3/1993 | Ragatz | |
| 5,219,402 A | 6/1993 | Kondo et al. | |
| 5,331,990 A | 7/1994 | Hall et al. | |
| 5,339,853 A | 8/1994 | Sokolis et al. | |
| 5,351,704 A | 10/1994 | Hunnicutt, Jr. et al. | |
| 5,411,044 A | 5/1995 | Andolfi | |
| 5,477,211 A * | 12/1995 | Reynolds | 340/540 |
| 5,554,975 A | 9/1996 | Hall et al. | |
| 5,588,735 A | 12/1996 | Harada | |
| 5,687,136 A * | 11/1997 | Borenstein | 367/116 |
| 5,722,445 A | 3/1998 | Hae et al. | |
| 5,793,900 A * | 8/1998 | Nourbakhsh et al. | 382/263 |
| 6,108,592 A * | 8/2000 | Kurtzberg et al. | 701/1 |
| 6,152,491 A | 11/2000 | Queentry | |

(Continued)

FOREIGN PATENT DOCUMENTS

GB 2110081 6/1983

OTHER PUBLICATIONS http://www.see4safety.com/information/information.htm, p. 1.

*Primary Examiner* — Thomas Mullen
(74) *Attorney, Agent, or Firm* — Michael S. Young; Hall Estill Attorneys at Law (57) ABSTRACT

In accordance with various embodiments, a walker has a body. An illumination source is supported by the body. The illumination source is configured to focus illumination on a target area. The target area includes both a leg of a user and ground adjacent the leg during an entire gait cycle of the user using the walker for assistance during ambulation.

19 Claims, 6 Drawing Sheets

(56) References Cited

U.S. PATENT DOCUMENTS

| | | |
|---|---|---|
| 6,278,366 B1 | 8/2001 | Fletcher et al. |
| 6,772,778 B2 | 8/2004 | Morosini et al. |
| 6,774,795 B2 | 8/2004 | Eshelman et al. |
| 6,842,692 B2 * | 1/2005 | Fehr et al. ............ 701/23 |
| 7,059,738 B1 | 6/2006 | Nobayashi |
| 7,267,281 B2 * | 9/2007 | Hopkins ............ 135/911 |
| 7,585,092 B2 | 9/2009 | Huffman |
| 7,784,479 B2 | 8/2010 | Navarro |
| 7,921,861 B2 | 4/2011 | Navarro |
| 7,957,153 B2 | 6/2011 | Rosenblatt et al. |
| 2005/0099307 A1 * | 5/2005 | Gilfix et al. ............ 340/573.1 |
| 2005/0279551 A1 * | 12/2005 | LoPresti ............ 180/167 |
| 2006/0025836 A1 | 2/2006 | Van Gerpen et al. |
| 2007/0000531 A1 | 1/2007 | Russo |
| 2007/0255186 A1 | 11/2007 | Grill |
| 2008/0072940 A1 | 3/2008 | Cheng et al. |
| 2008/0169011 A1 | 7/2008 | Ewell et al. |
| 2008/0180267 A1 * | 7/2008 | Kaneko et al. ............ 340/686.1 |
| 2009/0056777 A1 | 3/2009 | Lawhead |
| 2009/0223546 A1 | 9/2009 | Nazarian |
| 2010/0100013 A1 | 4/2010 | Hu et al. |
| 2010/0147342 A1 | 6/2010 | Navarro |
| 2011/0030748 A1 | 2/2011 | Navarro |
| 2011/0050883 A1 * | 3/2011 | Ghose et al. ............ 348/113 |

* cited by examiner

WALKER WITH ILLUMINATION, LOCATION, POSITIONING, TACTILE AND/OR SENSOR CAPABILITIES

RELATED APPLICATION

This application claims priority to U.S. Provisional Application No. 61/349,107 filed May 27, 2010, entitled "Ambulation Device with Sensor and Illumination Capabilities," which is herein incorporated by reference.

SUMMARY

Various embodiments of the present invention are generally directed to a mobility device (also known herein as a mobility aid), such as an ambulation device (e.g., a walker, a cane, a crutch), or a mobility device with a riding feature (such as a mobility chair, a wheelchair, etc.), with an illumination source, a location emitter, a global positioning system, a tactile signal emitter or a sensor device.

In accordance with various embodiments, an ambulation device is supporting a sensor, the sensor responds to a stimulus by indicating the location of the ambulation device.

In accordance with other various embodiments, a mobility aid is supporting at least one collision avoidance sensor, the at least one collision avoidance sensor provides a user with information regarding an obstacle.

In still other various embodiments, a mobility aid is supporting a sensor; and a tactile signal emitter coupled to the sensor, the tactile signal emitter provides a user with information received by the sensor via a tactile sensory system of the user.

These and other features and advantages which characterize the various embodiments of the present invention can be understood in view of the following detailed discussion and the accompanying drawings.

DETAILED DESCRIPTION OF EXEMPLARY EMBODIMENTS

Detailed descriptions of the exemplary embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

A user may have a variety of conditions for which the user requires mobility assistance. Various mobility devices to assist the user during movement are known in the art, such as the walker, the cane, the crutch, the mobility chair, the wheelchair, etc.

However, the user who requires the mobility device often has poor vision or needs to use the mobility device in an area with low levels of illumination. When the user walks with the mobility device, the user's own poor vision, or low levels of illumination in the environment, may lead to the user falling.

The user may be less likely to fall with improved illumination of their environment. The mobility device can provide illumination. The illumination may point ahead to where the user wants to travel; however, the illumination could focus on the user's leg and adjacent ground (or support surface) to provide the user with the user's position in the environment.

Figure 1:
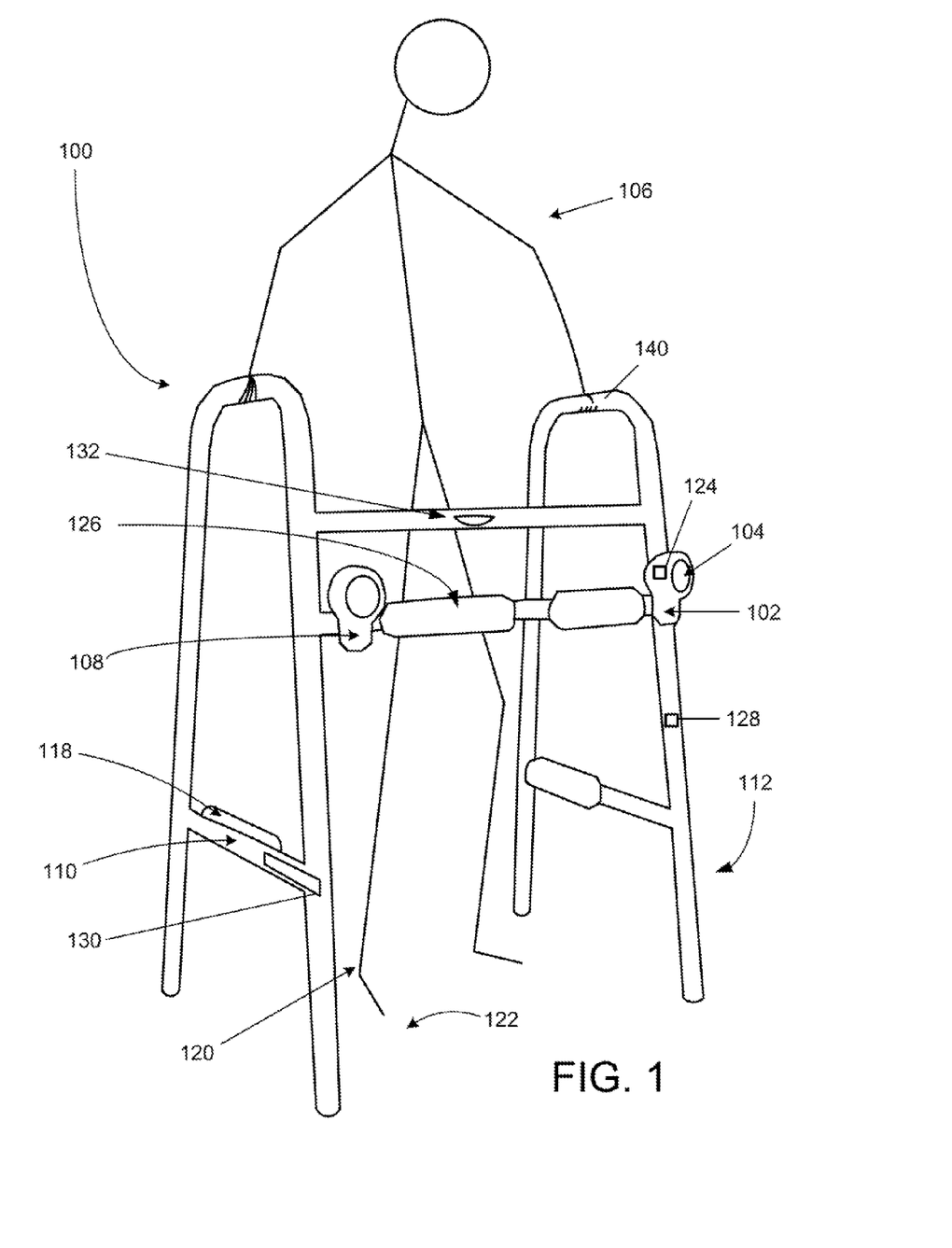
FIG. 1 shows a mobility device characterized as a walker.

FIG. 1 shows an exemplary embodiment of an a mobility device 100 includes at least a sensor 102 responsive to a stimulus; and a location emitter 104 coupled to the sensor 102 so that the stimulus received by the sensor 102 triggers the location emitter 104 to disclose a location of the mobility device 100 to a user 106. The mobility device 100 may have a plurality of sensors and location emitters.

In various embodiments, the apparatus is an ambulation device supporting a sensor, the sensor responds to a stimulus by indicating the location of the ambulation device. The apparatus may be a mobility device more generally.

In various embodiments, the sensor responds to the stimulus by activation of a signal emitter coupled to the sensor.

The sensor 102 may be responsive to motion or acoustics. The sensor 102 could be a sound activated light switch, such as the Clapper® or other suitable system, adapted to work with the power available in the mobility device 100.

The location emitter 104 is configured to provide visual or auditory information for the user 106 to locate the mobility device 100. The location emitter 104 may be a light source or a sound source. In an exemplary embodiment, the sensor 102 and the location emitter 104 are integrated, e.g., Sylvania LED Motion Sensor Light, SKU: 72178.

The location emitter 104 can be a sound source providing auditory location information. The skilled artisan can envision a variety of ways to produce sound, such as an electronic circuit that chirps.

In various embodiments, the sensor is responsive to acoustics and the signal emitter is a sound source.

In various embodiments, the sensor is responsive to motion and the signal emitter is a sound source.

In various embodiments, the sensor is responsive to acoustics and the signal emitter is a light source.

In various embodiments, the sensor is responsive to motion and the signal emitter is a light source.

The sensor 102 and the location emitter 104 may be integrated into a single housing 108. The housing 108 may be attached to the body 110 of the mobility device 100 by suitable fastener, such as Velcro, adhesive, screw, nail, rivet, or other fastener, known to one skilled in the art. However, the sensor 102 and the location emitter 104 may each have their own housing.

Or the sensor 102 or the location emitter 104 may be integrated into the body 110 of the mobility device 100. The mobility device 100 is commonly made from wood, metal (e.g. aluminum), plastic, or other sturdy lightweight material known to one skilled in the art. And the body 110 is often hollow (not shown), which provides space for incorporating the sensor 102, the location emitter 104, or other elements (e.g., wiring, circuits, power) required for operation of the mobility device 100 disclosed.

Figure 2:
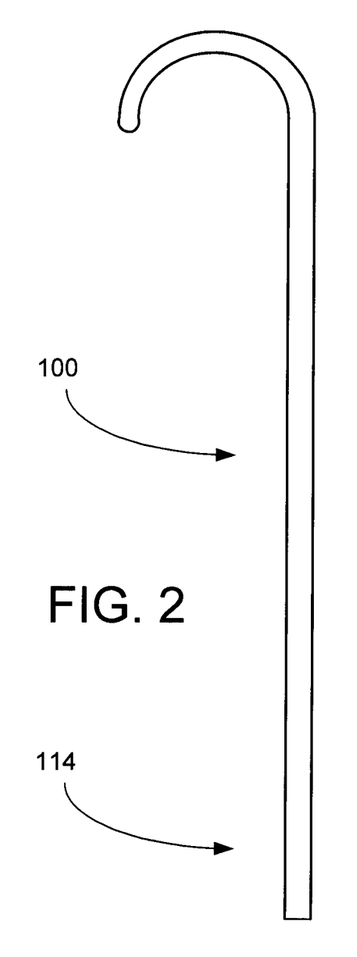
FIG. 2 illustrates a mobility device characterized as a cane.
Figure 3:
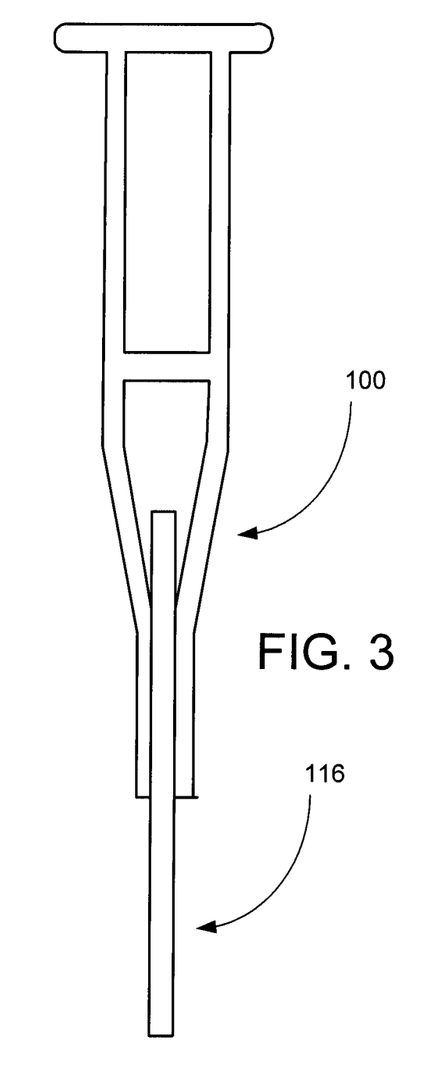
FIG. 3 depicts a mobility device characterized as a crutch.
Figure 4:
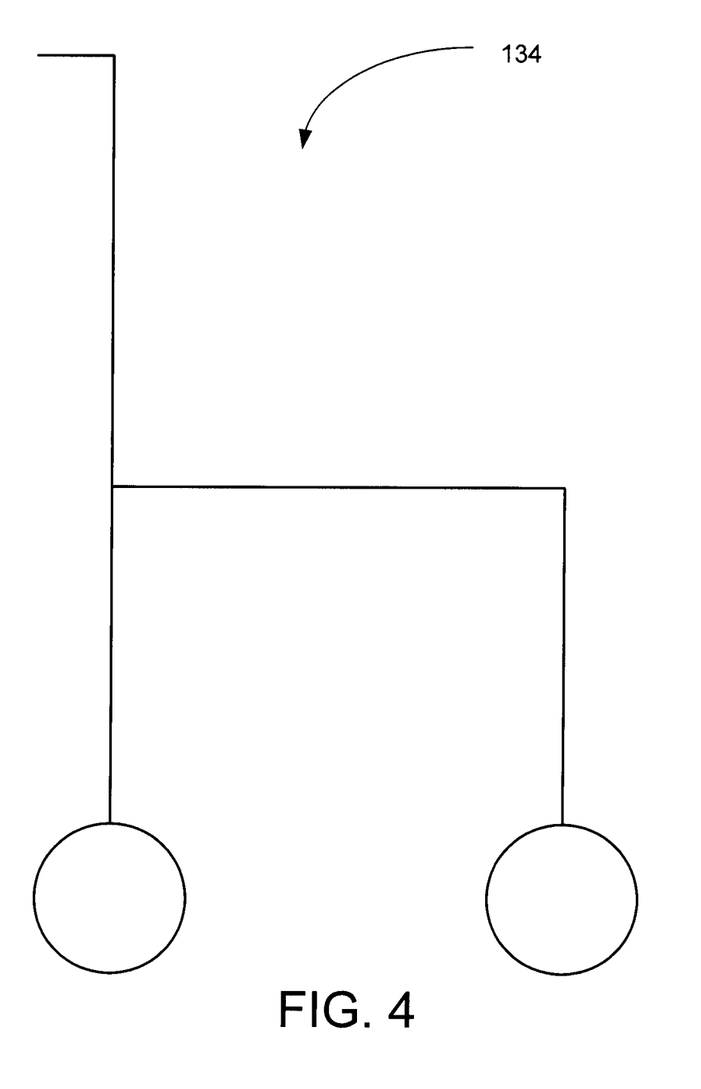
FIG. 4 shows a mobility device characterized as a mobility chair.
Figure 5:
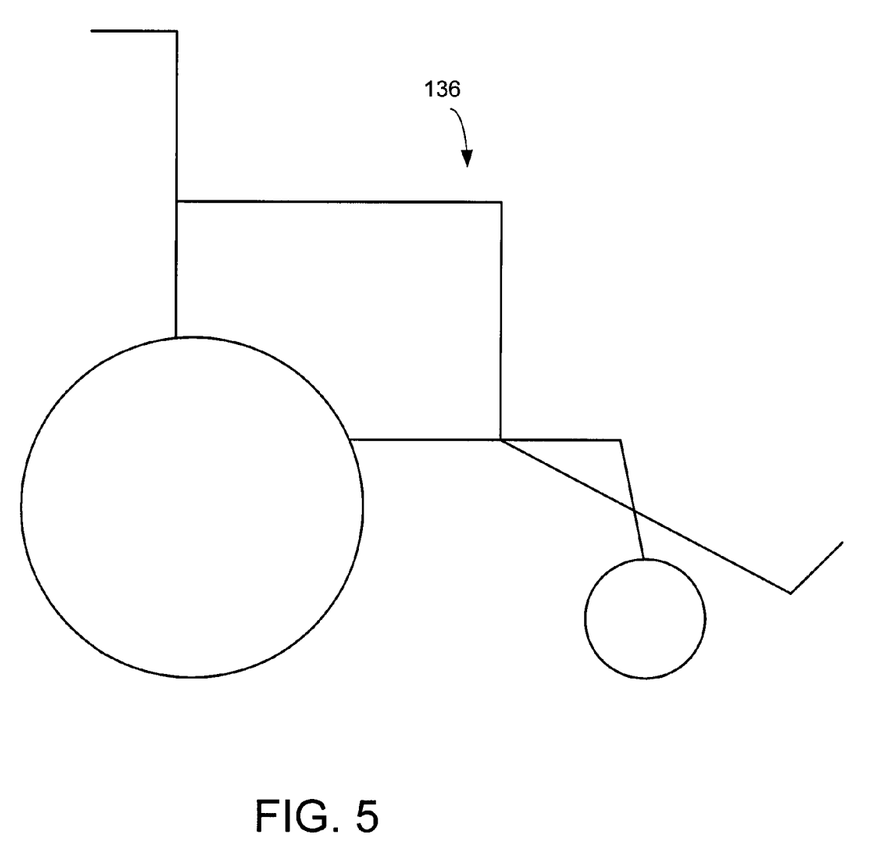
FIG. 5 illustrates a mobility device characterized as a wheelchair.

The mobility device may be characterized as a walker 112 (as shown in FIG. 1), a cane 114 (as illustrated in FIG. 2), a crutch 116 (as depicted in FIG. 3), a mobility chair 134 (as portrayed in FIG. 4), a wheelchair 136 (as represented in FIG. 5), although other suitable mobility devices may be used. The walker 112, the cane 114, and the crutch 116 are characterized as ambulation devices. The mobility chair 134 and the wheelchair 136 are characterized as mobility devices with riding features. The mobility devices with riding features for the user may be motor driven or non-motor driven.

FIG. 1 further portrays an exemplary embodiment of the mobility device 100 may include an illumination source 118; and the body 110 configured to support the illumination source 118 to focus illumination on a target area to aid mobility of the user 106, wherein the target area includes at least a leg 120 of the user 106 and the ground 122 adjacent the leg 120.

In various embodiments, the signal emitter is a light source that focuses on at least a leg of a user and a surface that supports the leg to aid mobility of the user.

In an exemplary embodiment, the illumination source 118 is a "tap" light that can be turned on or off, by the user 106 tapping the illumination source 118 with the leg 120, e.g., Linear DOT-it® Silver, SKU: 36021. The illumination source 118 may be attached to the body 110 by any suitable fastener known to one skilled in the art, and as discussed above. The illumination source 118 may be disposed in any suitable position adjacent the body 110, such as over, under, beside, inside, etc. to focus illumination on the target area. For example, positioning the illumination source 118 closer to the ground 122 (also known herein, as a support surface) could decrease the strength needed for the illumination source 118, which could extend life of a portable power supply. Alternatively, the illumination source may be LED rope light, or other suitable light source known to one skilled in the art. The illumination source 118 may be a plurality.

The target area may include the leg 120 in the stance phase of mobility. Alternatively, the target area may include the leg 120 in the swing phase of mobility. One skilled in the art understands that the leg 120 during a gait cycle of mobility is either in the stance phase (with the leg 120 on the ground 122) or in the swing phase (with the leg 120 not contacting the ground 122).

FIG. 1 still further reveals in an exemplary embodiment of the mobility device 100 the sensor 102 responsive to a stimulus, a switch 124 communicating with the sensor 102 for selection from among three states of the illumination source 118, the states consisting of triggered on by the sensor 102 responsive to the stimulus, off, and on. The illumination source 118 may only have the triggered on state, and no off state unless the illumination source 118 is without power. One or more switches 124 may be incorporated into the mobility device 100 to control one or more elements of the mobility device 100.

In addition, the mobility device 100 may include a pathway light 126 that projects in the general forward direction away from the mobility device 100 that aids the user 106 in mobility. The location emitter 104 may serve as the pathway light 126. The pathway light 126 may be an LED light or other suitable light source. The pathway light 126 may be attached to the body by any suitable fastener known to one skilled in the art, and as discussed above. In an alternative embodiment, the pathway light 126 may be made integral to the body 110.

In various embodiments, the signal emitter is a light source that projects in the general forward direction away from the ambulation device to help the user move.

A reflective member 128 or a glowing member 130 may be fastened to the body 110, as discussed above. An example of the reflective member 128 is 3M™ Scotchlite™ Reflective Tape. The glowing member 130, such as 3M™ Photoluminescent Film, glows in total darkness after exposure to a light source.

Other suitable sources for providing illumination as the pathway light 126, the reflective member 128, the glowing member 130, the location emitter 104, etc. will be known to one skilled in the art. In addition, a skilled artisan can envision providing illumination on any surface, not just those shown in FIG. 1, of the body 110 of the mobility device 100 to achieve the goals of allowing the user 106 to locate the mobility device 100 in a dark environment or allowing the user 106 to see or safely navigate through an otherwise dark environment to the mobility device 100 and to use the mobility device 100. Each source of illumination may be present in a plurality.

Likewise, the sensor 102 may be disposed on any surface not just those shown in FIG. 1, of the body 110 of the mobility device 100 to achieve the goal of configuring the sensor 102 to be responsive to a stimulus, which includes a stimulus produced by the user 106.

A power supply (not shown) for the various elements, e.g., the sensor 102, the location emitter 104, the illumination source 118, the pathway light 126, etc. should be portable with the mobility device 100 in an exemplary embodiment. The power supply can be a battery, such as alkaline, Lithium ion, etc. The power supply can be solar, or other suitable type. Each element can have its own power supply, or two or more elements may share a power supply.

Similarly, each element controllable by an electrical switch 124 may have its own switch 124 for triggered on, off, and on, or two or more elements may operate from a shared switch 124.

In a further embodiment, the mobility device 100 includes at least a collision warning system 132, e.g., Bendix™ VORAD® Collision Warning System, that provides visual and auditory information to the user 106 so that the user 106 with extremely poor vision or lighting may more safely negotiate their environment. In addition, a skilled artisan can envision providing the collision warning system 132 on any surface, not just that shown in FIG. 1, of the body 110 of the mobility device 100 to achieve the goal of providing visual and auditory information to the user 106.

Figure 6:
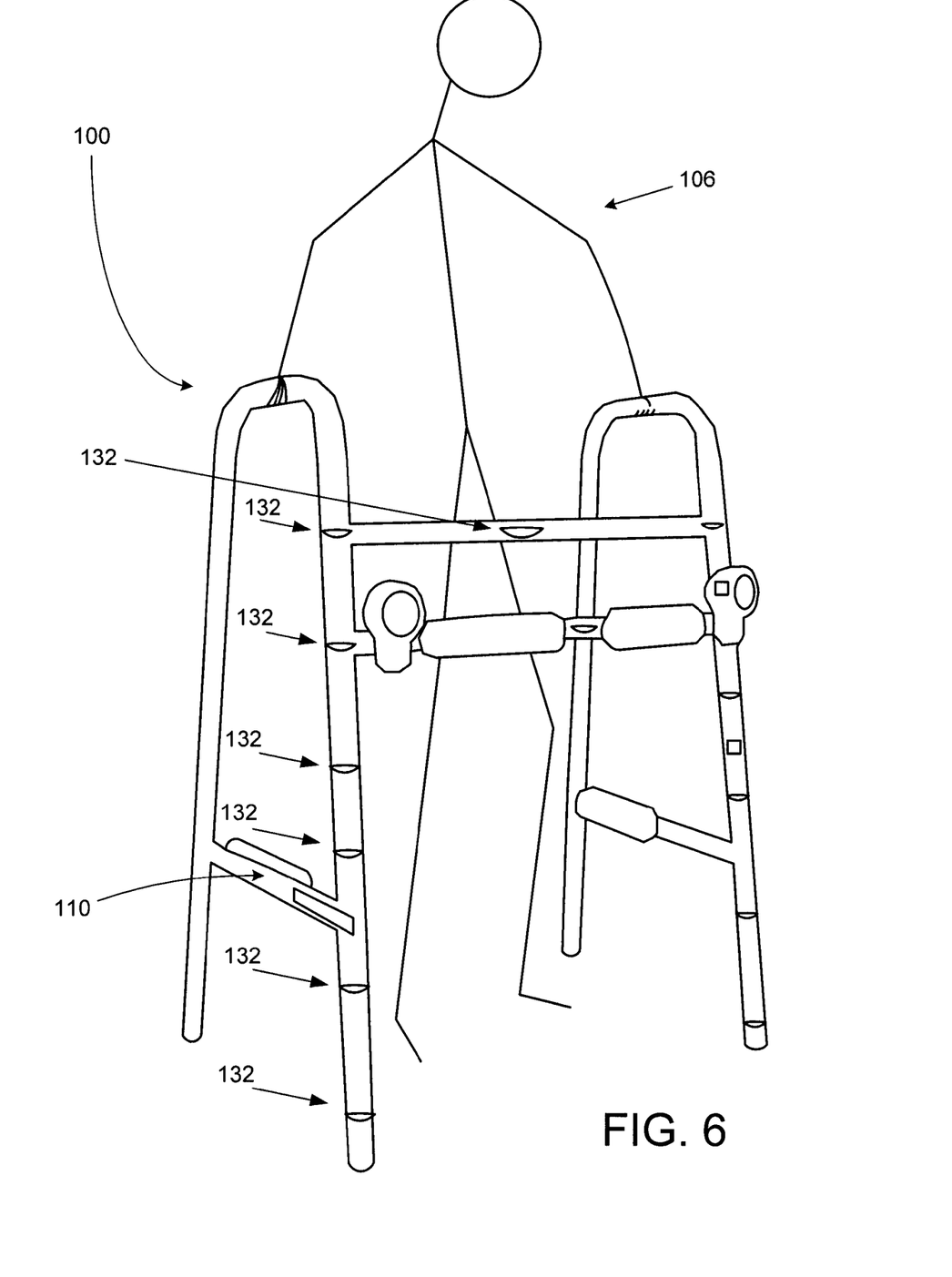
FIG. 6 depicts a mobility device with a plurality of collision avoidance sensors.

A plurality of the collision warning system 132 units may be configured to provide the user 106 information regarding various directions in the environment of the user 106. For example, the plurality of collision warning system 132 units may be arranged to provide right left right/left directional information. The plurality of collision warning system 132 units may be arranged vertically, as shown in FIG. 6, so that the height of an obstacle may be determined. Or the plurality of collision warning system 132 units may be arranged horizontally so the width of an obstacle may be determined. A pattern of responses obtained by the plurality of collision warning system 132 units responsive to the size and shape of obstacles in the environment could be used to identify items, or obstacles. A predetermined list of items can be created, which could account for the distance from the mobility device 100 of the item, etc. The items might include walls, curbs, doors, doorways, chairs, beds, etc.

In various embodiments, the mobility aid is supporting at least one collision avoidance sensor, the at least one collision avoidance sensor provides a user with information regarding an obstacle.

In various embodiments, the collision avoidance sensor is a radar-based system.

In various embodiments, the at least one collision avoidance sensor is arranged on the mobility aid to provide the user with the information via visual display.

In various embodiments, the at least one collision avoidance sensor is arranged on the mobility aid to provide the user with the information via sound output.

In various embodiments, the at least one collision avoidance sensor is arranged to provide the user with the information to guide the user around the obstacle via visual information.

In various embodiments, the at least one collision avoidance sensor is arranged to provide the user with the information to guide the user around the obstacle via sound information.

In various embodiments, the at least one collision avoidance sensor comprises a plurality of collision avoidance sensors.

In various embodiments, the plurality of collision avoidance sensors are vertically arranged to identify the obstacle from a predetermined list of items.

Figure 7:
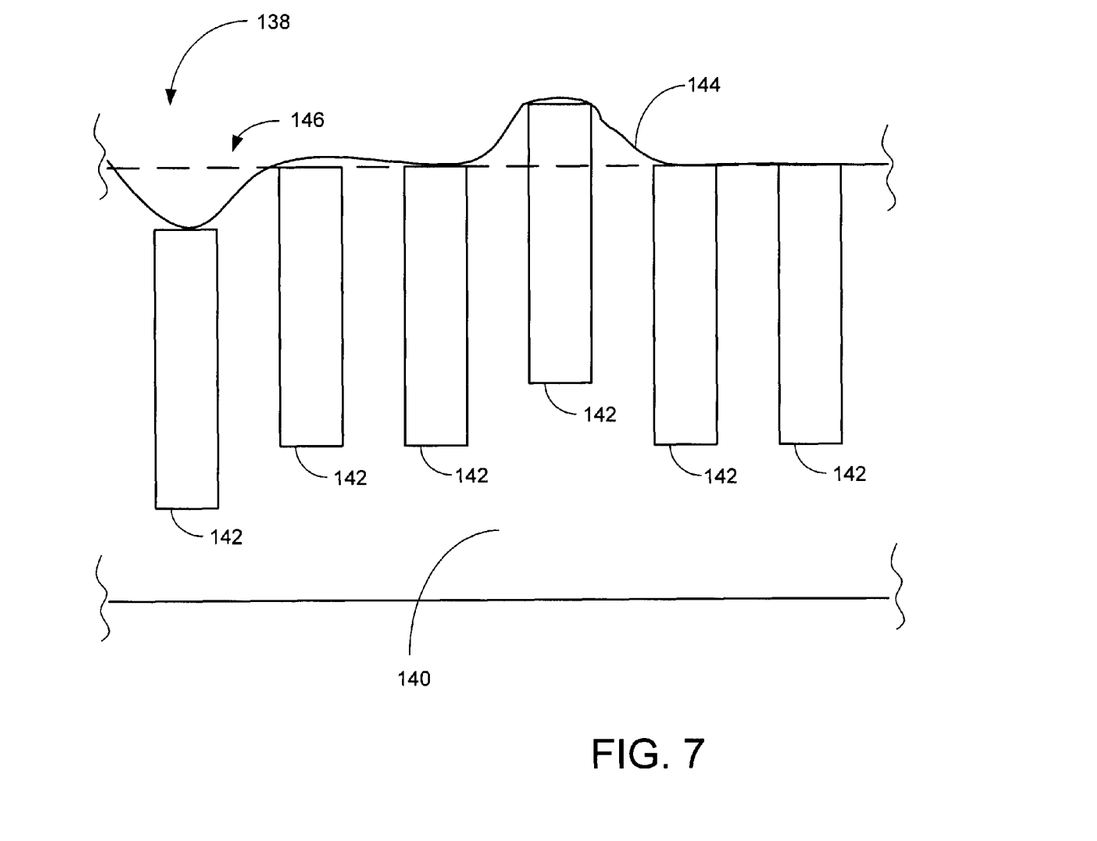
FIG. 7 shows a close view of a mobility device with a tactile emitter.

In connection with the collision warning system a fully integrated tactile emitter can be installed in the device, as shown in FIG. 7. The tactile emitter 138 (also known herein as "Braille Unit") may use Braille or other suitable messaging system. The tactile emitter 138 may be conveniently located in a handle 140 (as shown in FIG. 1) of the mobility device 100 so that a hand of the user 106 is adjacent the tactile emitter.

The tactile emitter could be built in various ways. For example, the Braille Unit in a handle of the mobility device 100 could be covered with a thin rubber covering that dimple sensors, such as might be effected by a plurality of solenoid pistons 142, would indent into and when the dimple sensors retracted the handle would be smooth again.

As shown more generally in FIG. 7, the tactile emitter 138 in the handle 140 could be built using a solenoid piston 142, or a plurality of solenoid pistons. The plurality of solenoid pistons 142 may be composed of various rows and columns, or other suitable geometric configuration. The solenoid piston(s) could be covered with a flexible covering 144, such as polymer, fabric, etc. The tactile emitter could be coupled to the flexible covering. The information may be conveyed by the solenoid pistons acting alone or in combination. The information may be conveyed by depression or projection of the solenoid pistons from a baseline position 146.

In various embodiments, the tactile signal emitter comprises a plurality of solenoid pistons activated in response to the stimulus received by the sensor to provide the information.

In various embodiments, the tactile emitter is covered with a flexible covering that deforms in response to activation of the plurality of solenoid pistons.

The tactile emitter could be integrated with a global positioning system (GPS), a camera, etc. so that the tactile emitter is activated by the sensor responsive to a stimulus.

In various embodiments, the sensor is a camera whose output is processed to produce the information.

The user 106 could be told through the tactile emitter to "turn right", "turn left", "stop", "continue", etc. Or in conjunction with the GPS the user 106 could be told their location within the resolution of the GPS, which would depend on the GPS used.

In various embodiments, the sensor is a GPS so that the user 106 could be told their location.

In another embodiment, a small camera mounted to the VORAD® Unit could transmit visual and auditory information to the user 106 so that the user 106 with extremely poor vision or lighting may more safely negotiate their environment in real time that is then converted to Braille to allow a user to read lights, books, etc.

While the invention has been described in connection with an exemplary embodiment, it is not intended to limit the scope of the invention to the particular form set forth, but on the contrary, it is intended to cover such alternatives, modifications, and equivalents as may be included within the spirit and scope of the invention as defined by the appended claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. An apparatus comprising:
a walker having a body; and
an illumination source supported by the body, the illumination source is configured to focus illumination on a target area, wherein the target area includes both a leg of a user and ground adjacent the leg during an entire gait cycle of the user using the walker for assistance during ambulation, in which the leg is one of two legs of the user, and the target area includes the two legs of the user and the ground adjacent the two legs during the entire gait cycle of the user.

2. The apparatus of claim 1, in which the body of the walker comprises four legs.

3. The apparatus of claim 1, in which the illumination source is a plurality of light sources, wherein each of the plurality of light sources emit light.

4. The apparatus of claim 1, in which the illumination source comprises a first light source configured to emit a first light and an opposing second light source configured to emit a second light.

5. The apparatus of claim 1, in which the illumination source is configured to transition between an ON state and an OFF state responsive to a tap from the leg.

6. The apparatus of claim 1, further comprising:
a sensor supported by the body; and
a light source supported by the body, wherein the light source transitions from an OFF state to an ON state responsive to activation of the sensor.

7. The apparatus of claim 1, further comprising a light source that projects in a general forward direction away from the walker to help the user move.

8. An apparatus comprising:
a body of a walker; and
an illumination source supported by the body, the illumination source is configured to focus illumination on a target area, wherein the target area includes two legs of a user and ground adjacent to the two legs during an entire gait cycle of the user.

9. The apparatus of claim 8, further comprising a light source supported by the body, wherein the light source projects light in a general forward direction away from the walker along a pathway walked by the user during the entire gait cycle.

10. The apparatus of claim 8, in which the target area is illuminated by a pair of opposing light sources that focus light on the target area.

11. The apparatus of claim 8, in which the target area includes an area where the user stands and moves forward while using the walker.

12. The apparatus of claim 8, in which the target area is configured to move forward when the user moves the walker forward during the entire gait cycle.

13. The apparatus of claim 8, in which the illumination source transitions between an ON state and an OFF state responsive to the user tapping the illumination source with at least one of the two legs.

14. The apparatus of claim 8, in which the body provides a left handle and a right handle to support a left hand and a right hand of the user, respectively.

15. The apparatus of claim 14, in which the illumination source is a plurality of light sources that project light on the target area.

16. A walker comprising:
a left side support;
a left illumination source supported by the left side support;
a right side support;
a right illumination source supported by the right side support;
a front support; and
a pathway light supported by the front support, the left illumination source and the right illumination source are configured to focus illumination on a target area, wherein the target area includes two legs of a user and ground adjacent the two legs during an entire gait cycle of the user using the walker for assistance during ambulation, and the pathway light projects in a general forward direction away from the walker in a general direction that the user moves during the entire gait cycle.

17. The walker of claim 16, in which the walker comprises four legs.

18. The walker of claim 16, in which at least one of the left illumination source and the right illumination source are configured to transition between an on ON state and an OFF state responsive to a tap from one of the two legs.

19. The walker of claim 16, in which the target area includes an area where the user stands and moves forward while using the walker.

\* \* \* \* \*